United States Patent
Zhang et al.

(10) Patent No.: US 9,344,488 B2
(45) Date of Patent: May 17, 2016

(54) APPLICATION TEST METHOD BASED ON SERVICE DELIVERY PLATFORM, AND SERVICE DELIVERY PLATFORM

(71) Applicant: Huawei Technologies Co., Ltd., Shenzhen (CN)

(72) Inventors: Fan Zhang, Shenzhen (CN); Honglin Liu, Shenzhen (CN); Chun Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 362 days.

(21) Appl. No.: 13/898,351

(22) Filed: May 20, 2013

(65) Prior Publication Data
US 2013/0254271 A1 Sep. 26, 2013

Related U.S. Application Data

(63) Continuation of application No. PCT/CN2011/075204, filed on Jun. 2, 2011.

(30) Foreign Application Priority Data

Nov. 18, 2010 (CN) .......................... 2010 1 0551292

(51) Int. Cl.
G06F 15/16 (2006.01)
H04L 29/08 (2006.01)
(Continued)

(52) U.S. Cl.
CPC ............ *H04L 67/10* (2013.01); *H04L 12/2697* (2013.01); *H04L 41/5051* (2013.01); *H04L 43/50* (2013.01); *H04L 63/08* (2013.01); *H04W 24/08* (2013.01)

(58) Field of Classification Search
CPC . H04L 12/2697; H04L 43/50; H04L 41/5051; H04L 67/10; H04L 63/08; H04W 24/06
USPC .......................... 709/203, 223–224; 455/423
See application file for complete search history.

(56) References Cited

U.S. PATENT DOCUMENTS

| | | | | |
|---|---|---|---|---|
| 7,493,520 B2 * | 2/2009 | Bhatia | ................. | G06F 11/3688 714/38.1 |
| 8,265,619 B1 * | 9/2012 | Hyde | .................... | H04W 24/06 455/423 |

(Continued)

FOREIGN PATENT DOCUMENTS

| | | |
|---|---|---|
| CN | 101141328 | 3/2008 |
| CN | 101237392 | 8/2008 |

(Continued)

OTHER PUBLICATIONS

Written Opinion of the International Searching Authority, including International Search Report, issued in corresponding International Application No. PCT/CN2011/075204 dated Sep. 15, 2011, 8 pages.

(Continued)

*Primary Examiner* — Oanh Duong
(74) *Attorney, Agent, or Firm* — Slater & Matsil, LLP

(57) ABSTRACT

Embodiments of the present invention provide an application test method based on a service delivery platform, and a service delivery platform. The method includes: receiving a service request message sent by an application server; determining whether the service request is a test request; if the service request is a test request, parsing the test request and obtaining a test instruction; and performing, according to the test instruction, a corresponding action and returning a corresponding response to the application server. With the method and the service delivery platform provided in the embodiments of the present invention, tests of all interfaces and service logic of an application can be covered without a test blind spot; and application test costs are decreased in the light of operators and application developers.

9 Claims, 4 Drawing Sheets

(51) Int. Cl.
  *H04L 12/26* (2006.01)
  *H04L 12/24* (2006.01)
  *H04L 29/06* (2006.01)
  *H04W 24/08* (2009.01)

(56) References Cited

U.S. PATENT DOCUMENTS

| 8,286,043 | B2 * | 10/2012 | Sakada et al. ................. | 714/733 |
| 8,504,319 | B2 * | 8/2013 | Qian et al. .................... | 702/117 |
| 8,543,104 | B2 * | 9/2013 | Kurokochi et al. ........... | 455/424 |
| 8,856,211 | B1 * | 10/2014 | Kassamali .............. | H04L 43/50 709/203 |
| 2007/0115860 | A1 | 5/2007 | Samele et al. | |
| 2008/0104575 | A1 | 5/2008 | Fan et al. | |

FOREIGN PATENT DOCUMENTS

CN 101237392 A * 8/2008
WO WO0199405 12/2001

OTHER PUBLICATIONS

Extended European Search Report received in Application No. 11783082.8-1853, mailed Apr. 4, 2014, 10 pages.

Hewlett-Packard , "HP Service Delivery Platform," http://hp.telecomtv.com/mobileworld08/collateral/Service_Delivery_Platform_Mash-up/SDP.pdf, Oct. 1, 2007, 8 pages.

Lin, Yi-Bing, et al., "NTP-SIOT: A Test Tool for Advanced Mobile Services," IEEE Network, Jan.-Feb. 2007, pp. 21-26.

Magedanz, T., et al., "The IMS Playground @ Fokus—An Open Testbed for Next Generation Network Multimedia Services," Proceedings of the First International Conference on Testbeds and Research Infrastructures for the Development of Networks and Communities (TRIDENTCOM '05), IEEE Computer Society, Feb. 23, 2005, 10 pages.

* cited by examiner

APPLICATION TEST METHOD BASED ON SERVICE DELIVERY PLATFORM, AND SERVICE DELIVERY PLATFORM

CROSS-REFERENCE TO RELATED APPLICATIONS

This application is a continuation of International Application No. PCT/CN2011/075204, filed on Jun. 2, 2011, which claims priority to Chinese Patent Application No. 201010551292.X, filed on Nov. 18, 2010, both of which are hereby incorporated by reference in their entireties.

FIELD OF THE INVENTION

The present invention relates to an application test, and in particular, to an application test method based on a service delivery platform, and a service delivery platform.

BACKGROUND OF THE INVENTION

An SDP (Service Delivery Platform, service delivery platform) is a platform provided for telecommunication operators, third-party SPs (Service Provider, service provider), and massive common people to rapidly develop applications and put their applications online. The developed APPs (Application, application) may run at a server end or run at a terminal. FIG. 1 shows a position of the SDP platform in a network, where the SDP opens a variety of telecommunication capabilities through standard interfaces to enable the third party, operators, or APP developers to develop the APPs rapidly.

After completing the development of an APP, the operators, the third-party SPs, and the ordinary application developers need to test the developed APP, including testing interfaces and testing service logic. In the testing of interfaces, all interfaces of the APP used as a client and as a server are tested to ensure that the APP is capable of communicating with the SDP at an interface level. In the testing of service logic, it is required to test whether the logic of the APP is correct and whether the APP is capable of interfacing with the SDP system in service logic.

Currently, an APP test method is a test pile solution, in which an APP developer develops a test pile, and the test pile interfaces with the APP to test interfaces and service logic of the APP. In an interface test, the APP developer constructs a corresponding test pile through interface definitions, and simulates an SDP interface. In a service logic test, the APP developer constructs a test case according to functional characteristics of the SDP, and tests the service logic of the APP one by one in an interface simulation manner. Because the APP developer needs to construct a test pile for all services related to the APP in the test pile solution, the workload is great. For example, the APP developer needs to consider all interfaces and logic used in the APP when developing a test pile, and needs to maintain interfaces and logic of the test pile. Once the SDP interfaces and the SDP logic are changed, the test pile needs to be updated accordingly. Moreover, different developers all need to develop a test pile, thereby increasing the workload and reducing a speed of putting the service online on the whole. Furthermore, if the test pile developer has an understanding of the SDP interfaces and SDP service logic inconsistent with those of real SDP, errors in the interfaces and logic may be introduced directly to the APP.

Currently, another APP test method is a test bed solution, that is, an operator opens a test environment to a third party to perform an APP test. In this solution, a set of SDP test environment is deployed, and a version of the SDP test is consistent with a commercial SDP version. Therefore, the interfaces and service logic are the same as those of the commercial SDP. However, because the environment is test environment, it cannot interface with neighboring commercial SDPs. Therefore, the solution has some limitations. In one aspect, it is easy to test an interface for which the test bed is used as a server. But, an interface for which the test bed is used as a client cannot be tested as the test bed cannot send a request message to the application. In another aspect, because the test bed cannot interface with the real commercial SDP, an end-to-end service logic test cannot be performed. In still another aspect, the operator needs to provide additional resources to install and maintain the test bed environment, and this part of resources cannot produce production benefits, thereby resulting in increased operating costs.

SUMMARY OF THE INVENTION

Embodiments of the present invention provide an application test method based on a service delivery platform, and a service delivery platform, so as to decrease APP test costs in the light of operators and APP developers.

The objective of the embodiments of the present invention is implemented through the following technical solutions.

In one aspect, an embodiment of the present invention provides an application test method based on a service delivery platform, where the method includes: receiving a service request message sent by an application server; determining whether the service request is a test request; if the service request is a test request, parsing the test request and obtaining a test instruction; and performing, according to the test instruction, a corresponding action and returning a corresponding response to the application server.

In another aspect, an embodiment of the present invention further provides a service delivery platform. The service delivery platform includes: a receiving unit, configured to receive a service request message sent by an application server; a determining unit, configured to determine whether the service request received by the receiving unit is a test request; a parsing unit, configured to, when a determining result of the determining unit is that the service request is a test request, parse the test request and obtain a test instruction; a test unit, configured to perform a corresponding action according to the test instruction obtained by performing parsing by the parsing unit; and a sending unit, configured to return a corresponding response to the application server after the test unit performs the corresponding action.

With the method and the service delivery platform provided in the embodiments of the present invention, tests of all interfaces and service logic of an application can be covered without a test blind spot; and application test costs are decreased in the light of operators and application developers.

BRIEF DESCRIPTION OF THE DRAWINGS

The accompanying drawings described herein are provided for further understanding of the present invention, which are a part of the application, but are not intended to limit the present invention. In the drawings.

DETAILED DESCRIPTION OF THE EMBODIMENTS

In order to make the objectives, technical solutions, and advantages of the present invention more comprehensible, the following clearly and completely describes the technical solutions according to the embodiments of the present invention with reference to the accompanying drawings in the embodiments of the present invention. The exemplary embodiments of the present invention and the description thereof are illustrative in nature, and shall not be construed as limitations on the present invention.

Figure 1:
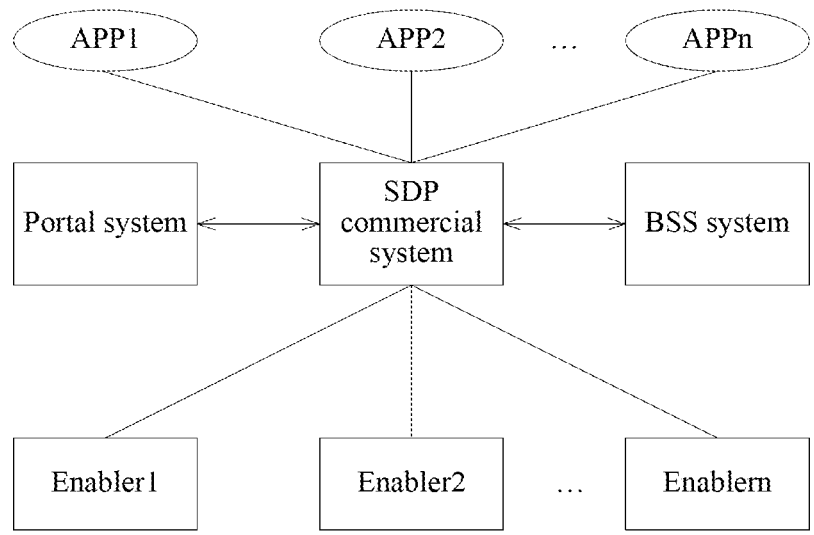
FIG. 1 is a schematic diagram showing a position of an SDP platform in a network.
Figure 2:
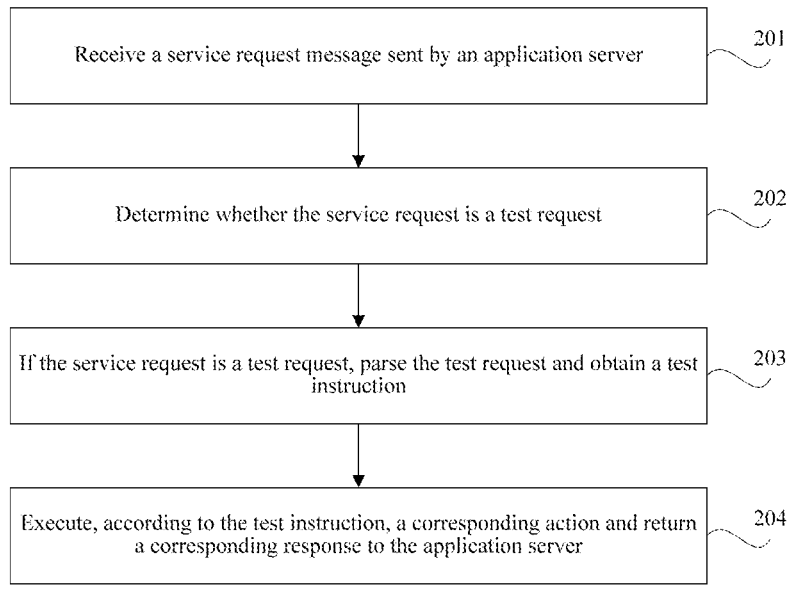
FIG. 2 is a flowchart of a method according to an embodiment of the present invention.

FIG. 2 is a flowchart of an application test method based on a service delivery platform provided in an embodiment of the present invention. The method is applied in a commercial service delivery platform. Referring to FIG. 2, the method includes the following steps:

Step 201: Receive a service request message sent by an application server.

The service request message may be a commercial request or a test request, which may be specifically differentiated according to a service address requested by the service request message, or differentiated according to a specific value of a designated field of the service request message, or differentiated according to a newly added field of the service request message, and this embodiment is not limited thereto.

The commercial request is a request initiated to the service delivery platform SDP, in order to use or obtain a service provided by an operator. The commercial request is a request processed by the existing service delivery platform, so the details are not described herein again.

Step 202: Determine whether the service request is a test request.

It may be determined whether the service request is a test request according to a service address requested by the service request message. For example, if a service address of the commercial request is different from that of the test request, it may be determined whether the service request is a test request according to the service address requested by the service request message. It may also be determined whether the service request is a test request according to a value of a preset field in the service quest message. For example, if a specific value is set for a certain field in the service request message to indicate that the service request is a test request, it may be determined whether the service request is a test request according to the specific value. It may also be determined whether the service request is a test request according to an extended field in the service request message. For example, if a new field is extended in the service request message to indicate that the service request is a test request, it may be determined whether the service request is a test request according to the extended field. The above descriptions are just examples, and this embodiment is not limited thereto.

Step 203: If the service request is a test request, parse the test request and obtain a test instruction.

If the service request is not a test request, the commercial process is performed, that is, the service delivery platform processes the service request message according to a common commercial process.

A test instruction is set according to test requirements. For example, the test instruction may be a designated response, for example, constructing a response indicating normal or constructing a response indicating abnormal. The test instruction may also be a report with a designated status or may be a special process, for example, an instruction for constructing a mobile originated MO request message through a mobile terminated MT request message. The test instruction is shown in the following table.

| Instruction category | Instruction value | Behavior description | Applicable scope |
|---|---|---|---|
| designated response | NULL (without a test instruction) | To construct a response indicating normal and return the response | All requests. |
| | GenericClientError | To construct a response indicating that the service layer SVC 0001 and the HTTP layer 400 are abnormal | All requests. |
| | SubscriberNotExist | To construct a response indicating that the service layer SVC 1005 and the HTTP layer 404 are abnormal | All requests including user IDs |
| | NotificationNotSupported | To construct a response indicating that the service layer SVC 1008 and the HTTP layer 400 are abnormal | All registration requests, such as: StartSMSNotification |
| | MediaTypeNotSupported | To construct a response indicating that the service layer POL 0011 and the HTTP layer 403 are abnormal | MMS MT request |
| Report with designated status | DeliveredtoTerminal | To construct a status report with a status of "Delivered To Terminal" | SMS MT and MMS MT processes |
| | DeliveryImpossible | To construct a status report with a status of "Delivery Impossible" | SMS MT and MMS MT processes |
| | DeliveredNetworkand Terminal | To first construct a status report with a status of "Delivered To Network", and construct a status report with a status of "Delivered To | SMS MT and MMS MT processes |

-continued

| Instruction category | Instruction value | Behavior description | Applicable scope |
|---|---|---|---|
| Special process | Mt To Mo | Terminal" when the acquisition or "notify" is performed for the second time. To construct an MO request through an MT request message and send the message to the application server. | SMS MT and MMS MT processes |

The above test instructions are just examples, and this embodiment is not limited thereto.

The test request may be parsed and a test instruction may be obtained by using a newly added test module on the SDP.

Step 204: Perform, according to the test instruction, a corresponding action and return a corresponding response to the application server.

The descriptions are still provided by taking the test instructions in the above table as an example. If the test instruction is NULL, which is obtained by performing parsing, that is, the test request does not include a test instruction, a response indicating normal is constructed and then returned to the application server in this step. If the test instruction is genericClientError, which is obtained by performing parsing, a response indicating that the service layer SVC 0001 and the HTTP layer 400 are abnormal is constructed and returned to the application server in this step. If the test instruction is deliveredToTerminal, which is obtained by performing parsing, a response message indicating normal is first returned to the application server in this step, and then a status report with a status of DeliveredToTerminal is constructed and then sent to the application server. If the test instruction is "Mt To Mo", which is obtained by performing parsing, a response message indicating normal is first returned to the application server in this step, and then a request message for notifying the application server to receive is constructed according to the service request message and then sent to the application server, and a response returned by the application server is received.

When the request message for notifying the application server to receive is constructed according to the service request message, message content or preset content of the service request message may be used as message content of the request message for notifying the application server to receive. A message receiver address of the service request message or a preset sender address is used as a message sender address of the request message for notifying the application server to receive. A message sender address of the service request message or a preset receiver address is used as a message receiver address of the request message for notifying the application server to receive.

The corresponding action performed according to the test instruction may also be implemented by a test module superposed on the SDP, a corresponding response may be returned to the application server through an original commercial process of the SDP, and this embodiment is not limited thereto.

In this embodiment, before it is determined whether the service request is a test request, a common commercial process may be performed, including access verification, interface check, service authentication, and abnormality processing. In another embodiment, according to the requirements, the foregoing commercial process may be performed after it is determined whether the service request is a test request, and this embodiment is not limited thereto.

The description is provided through an example of a format check and authentication below. After step 201 is performed according to the method of this embodiment, the following steps may be performed before step 202:

S1: Perform a format check on the service request message. If the format check fails, a response indicating abnormal is returned to the application server. If the format check succeeds, step S2 is performed.

S2: Send an authentication request message to an operation support system to request the operation support system to authenticate the service request.

S3: Receive an authentication response message returned by the operation support system, where the authentication response message includes an authentication result. If the authentication result is that the authentication fails, a response indicating abnormal is returned to the application server. If the authentication result is that the authentication succeeds, step 202 is performed, namely, determine whether the service request is a test request.

With the method according to this embodiment, a test module is added on the SDP. When the service request is a test request, a test instruction is obtained by parsing the test request through the test module, an action corresponding to the test instruction is performed, and a message is forwarded still through the commercial process of the SDP in the subsequent procedure. In this manner, costs of the application test can be decreased, the test efficiency can be improved, and all interface and service logic tests can be covered in an end-to-end manner.

To make the method of this embodiment clearer and more comprehensible, the method of this embodiment is described in detail in the following, in which a test is performed in the case that an application is used as an interface client and an application is used as an interface server by using the method of this embodiment.

Figure 3:
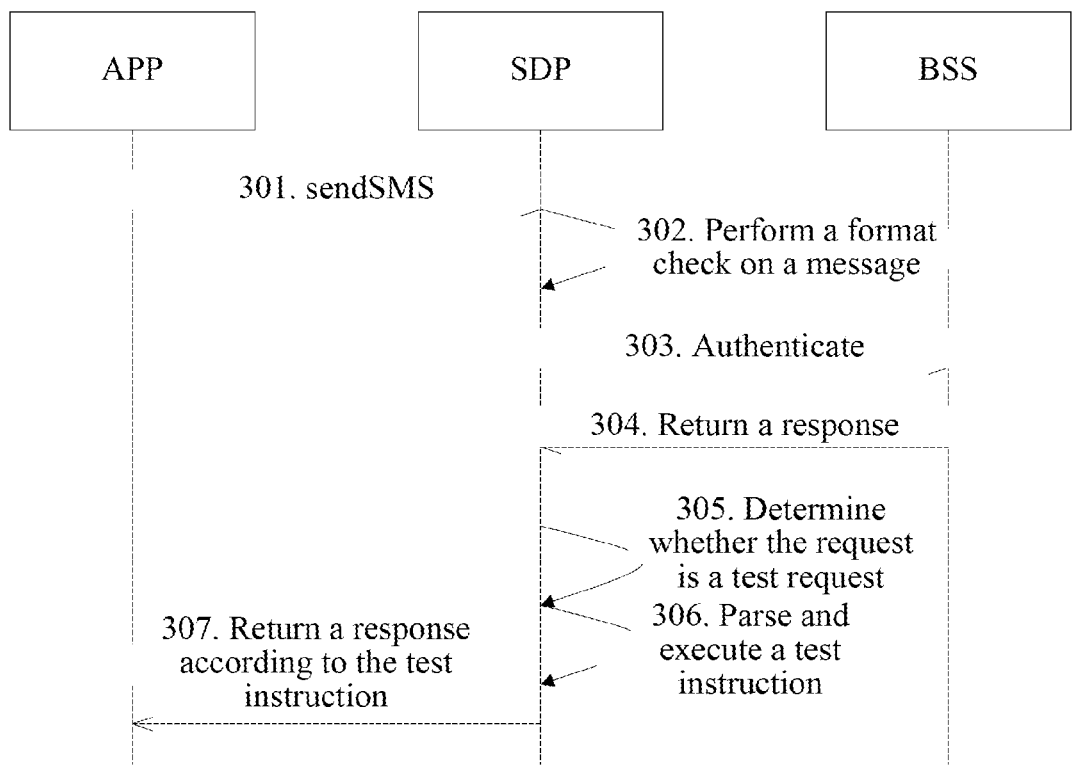
FIG. 3 is a flowchart of a test performed by using the method of an embodiment in the case that an application is used as an interface client.

FIG. 3 is a flowchart of a test performed by using the method of this embodiment in the case that an application is used as an interface client. In this embodiment, the application server APP, a bearer of the application, sends a short message to the SDP, in which an interface name related to an SMS (Short Message Service, short message service) is sendSMS in the Parlay X standard. Referring to FIG. 3, the flow includes the following steps:

Step 301: The APP initiates a sendSMS request to the SDP.

Step 302: After receiving the request, the SDP performs a format check. If the format check fails, a response indicating abnormal is returned to the APP directly. If the format check succeeds, step 303 is performed.

Step 303: The SDP initiates an authentication request to a BSS and determines, through the BSS, whether a user has a related permission.

Step 304: The BSS returns an authentication response. If the authentication fails, the SDP returns a response indicating abnormal to the APP. If the authentication succeeds, step 305 is performed.

Step 305: Determine whether the request is a test request. If the request is a test request, step 306 is performed. If the request is not a test request, a common commercial procedure is performed.

Step 306: Parse and execute a test instruction in the sendSMS request.

Step 307: Return a response or perform a corresponding action according to requirements of the test instruction.

In this embodiment, the parsing and execution of the test instruction in the sendSMS request in step 306 may be implemented by the test module added on the SDP, and this embodiment is not limited thereto.

In one embodiment, if the test instruction obtained by performing parsing in step 306 is genericClientError, the test module constructs, according to the test instruction, a response indicating that the service layer SVC 0001 and the HTTP layer 400 are abnormal, and returns the response to the APP through an SDP commercial process.

According to the method of this embodiment, a service request message carries a test instruction to be executed by the SDP, the instruction may be requesting the SDP to return a response indicating normal or a response indicating abnormal, or to perform a specific action according to a specific process. In this manner, costs of the APP test are decreased, the test efficiency is improved, and all interface and service logic tests are covered in an end-to-end manner.

Figure 4:
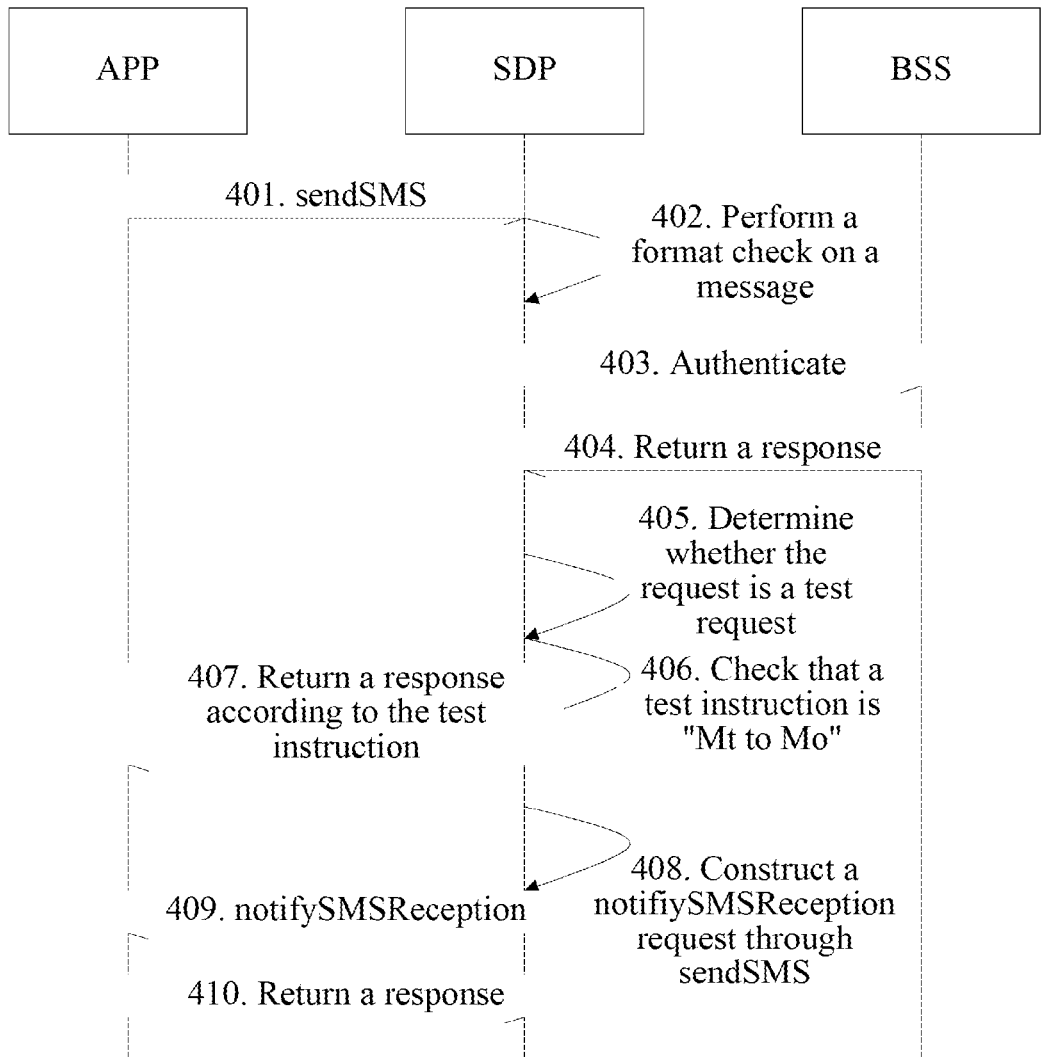
FIG. 4 is a flowchart of a test performed by using the method of an embodiment in the case that an application is used as an interface server.

FIG. 4 is a flowchart of a test performed by using the method of this embodiment in the case that an APP is used as an interface server. In this embodiment, the APP receives a short message sent by the SDP, in which an interface name related to the SMS (Short Message Service, short message service) is notifySMSReception in the Parlay X standard. Referring to FIG. 4, the flow includes the following steps:

Step 401: The APP initiates a sendSMS request to the SDP.

Step 402: After receiving the request, the SDP performs a format check. If the format check fails, a response indicating abnormal is directly returned to the APP. If the format check succeeds, step 403 is performed.

Step 403: The SDP initiates an authentication request to a BSS and determines, through the BSS, whether a user has a related permission.

Step 404: The BSS returns an authentication response. If the authentication fails, the SDP returns a response indicating abnormal to the APP. If the authentication succeeds, step 405 is performed.

Step 405: Determine whether the request is a test request. If the request is a test request, step 406 is performed. If the request is not a test request, the common commercial process is performed.

Step 406: Parse and execute a test instruction in the sendSMS request.

In this embodiment, the test instruction is "Mt To Mo".

Step 407: The SDP returns sendSMSResponse to the APP.

Step 408: Construct a notifySMSReception request according to the test instruction.

In this embodiment, there are multiple construction modes, for example, in a notifySMSReception request, the message content adopts message content or a configuration value in the sendSMS request, a message sender address adopts a message receiver address or a configuration value in the sendSMS request, and a message receiver address adopts a message sender address or a configuration value in the sendSMS request.

Step 409: Send the notifySMSReception request to the APP.

Step 410: After the processing, the APP returns a response to the SDP.

In this embodiment, the parsing and execution of the test instruction in the sendSMS request in step 406, and the construction of the notifySMSReception request according to the test instruction in step 408 may be implemented by the test module added on the SDP, and this embodiment is not limited thereto.

Because the test needs to be performed in the case that the application is used as an interface server, a message is constructed according to the method of this embodiment and then sent to the application server. In this manner, costs of the application test can be decreased, the test efficiency can be improved, and all interface and service logic tests can be covered in an end-to-end manner.

With the method according to this embodiment, a test module is added on the SDP and the SDP process may be multiplexed, which makes the test environment closer to a real environment, thereby improving the test correction. Compared with the conventional test bed method, the method of this embodiment needs lower implementation costs and maintenance costs, where an interface test using the APP as a server may be implemented by constructing a request message for notifying the application server to receive and sending the request message to the APP. Compared with the conventional test pile method, the method of this embodiment improves the test correction, frees ordinary developers from the complicated development of the test pile, and makes them to carry out more valuable application development, thereby improving enthusiasm of the developers.

Figure 5:
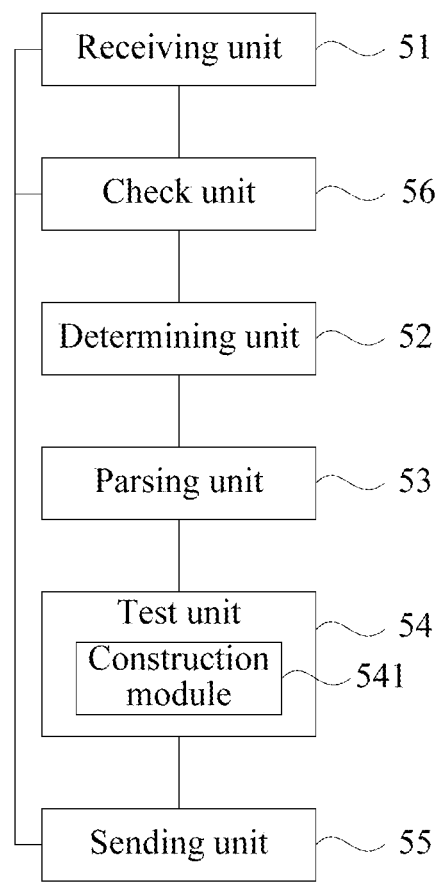
FIG. 5 is a block diagram of a structure of an SDP according to an embodiment.

FIG. 5 is a block diagram of a structure of a service delivery platform provided in an embodiment of the present invention. Referring to FIG. 5, the service delivery platform includes:

a receiving unit 51, configured to receive a service request message sent by an application server;

a determining unit 52, configured to determine whether the service request received by the receiving unit 51 is a test request;

a parsing unit 53, configured to, when a determining result of the determining unit 52 is that the service request is a test request, parse the test request and obtain a test instruction;

a test unit 54, configured to perform a corresponding action according to the test instruction obtained by performing parsing by the parsing unit 53; and a sending unit 55, configured to return a corresponding response to the application server after the test unit 54 performs the corresponding action.

In this embodiment, the determining unit 52 is specifically configured to: determine whether the service request is a test request according to a service address requested by the service request message, or determine whether the service request is a test request according to a value of a preset field in the service request message, or determine whether the service request is a test request according to an extended field in the service request message.

In an embodiment, the service delivery platform further includes:

a check unit 56, configured to perform a format check on the service request message before the determining unit 52 determines whether the service request is a test request. The sending unit 55 is configured to return a response indicating abnormal to the application server when a check result of the check unit 56 is that the format check fails and to send an authentication request message to an operation support system to request the operation support system to authenticate the service request when the check result of the check unit 56 is that the format check succeeds.

In this embodiment, the receiving unit 51 is further configured to receive an authentication response message returned by the operation support system after the sending unit 55 sends an authentication request message to the operation support system, where the authentication response message includes an authentication result. The sending unit 55 is configured to return a response indicating abnormal to the application server when the authentication result is that the authentication fails and to determine, through the determining unit 52, whether the service request is a test request when the authentication result is that the authentication succeeds.

In one embodiment, the test instruction obtained by performing parsing by the parsing unit includes: constructing a correct response, constructing a response indicating that a service layer is abnormal, constructing a status report, or constructing a mobile originated request message through a mobile terminated request message.

In one embodiment, the test unit 54 includes:

a construction module 541, configured to, when a test instruction obtained by performing parsing by the parsing unit 53 is constructing a mobile originated request message through a mobile terminated request message, construct, according to the service request message, a request message for notifying the application server to receive. The sending unit 55 is configured to send the request message for notifying the application server to receive to the application server, and the receiving unit 51 is configured to receive a response returned by the application server.

In this embodiment, the construction module 541 is specifically configured to: construct a request message for notifying the application server to receive and including message content, a message sender address, and a message receiver address, where the message content is message content in the service request message or preset content, the message sender address is a message receiver address of the service request message or a preset sender address, and the message receiver address is a message sender address of the service request message or a preset receiver address.

The components of the service delivery platform of this embodiment are respectively configured to implement the steps of the foregoing method embodiments. Since the steps are described in detail in the foregoing method embodiments, the details are not described herein again.

In this embodiment, a test module is added on the SDP, when the service request is a test request, a test instruction is obtained by parsing the test request through the test module, an action corresponding to the test instruction is performed, and a message is forwarded still through the SDP commercial process in the following procedure. In this manner, costs of the application test can be decreased, the test efficiency can be improved, and all interface and service logic test can be covered in an end-to-end manner.

The methods or steps described herein may be implemented by using hardware directly or by using a software module executed by a processor, or by using both of them. The software module may be located in a Random Access Memory (RAM), a computer memory, a Read Only Memory (ROM), an Electrically Programmable Read Only Memory (EPROM), an Electrically Erasable Programmable Read Only Memory (EEPROM), a register, a hard disk, a removable disk, a Compact Disk-Read Only Memory (CD-ROM), or any other storage media well-known in the art.

Detailed above are the technical solutions, objectives and merits of the present invention. Those descriptions are merely preferred embodiments of the present invention, but not intended to limit the scope of the present invention. Any modification, equivalent replacement, or improvement made without departing from the spirit and principle of the present invention should fall within the scope of the present invention.

What is claimed is:

1. A method for testing application based on a service delivery platform (SDP) comprising:
   receiving, by the SDP, a service request message sent by an application server;
   determining, by the SDP, that the service request is a test request;
   parsing, by the SDP, the test request and obtaining a test instruction from the test request, wherein the test instruction comprises an instruction for at least one of constructing a response indicating normal, constructing a response indicating abnormal, constructing a status report, or constructing a mobile originated request message through a mobile terminated request message; and
   performing, by the SDP, according to the test instruction, a corresponding action and returning a corresponding response to the application server;
   wherein the performing the corresponding action according to the test instruction comprises performing, in response to the test instruction being an instruction for constructing the mobile originated request message through the mobile terminated request message, constructing, according to the service request message, a request message for the application server, sending the request message for the application server to the application server, and receiving a response returned by the application server.

2. The method according to claim 1, wherein the determining the service request is a test request specifically comprises:
   determining whether the service request is a test request according to a service address requested by the service request message; or
   determining whether the service request is a test request according to a value of a preset field in the service request message; or
   determining whether the service request is a test request according to an extended field in the service request message.

3. The method according to claim 1, wherein before the determining whether the service request is a test request, the method further comprises:
   performing a format check on the service request message;
   if the format check fails, returning a response indicating abnormal to the application server;
   if the format check succeeds, sending an authentication request message to an operation support system to request the operation support system to authenticate the service request;
   receiving an authentication response message returned by the operation support system, wherein the authentication response message comprises an authentication result;
   if the authentication result is that the authentication fails, returning a response indicating abnormal to the application server; and
   if the authentication result is that the authentication succeeds, determining whether the service request is a test request.

4. The method according to claim 1, wherein the constructing, according to the service request message, a request message for the application server comprises:
   using message content in the service request message or preset content as message content of the request message for notifying the application server to receive, using a message receiver address of the service request message or a preset sender address as a message sender address of the request message for notifying the application server to receive, and using a message sender address of the service request message or a preset receiver address as a message receiver address of the request message for notifying the application server to receive.

5. A service delivery platform, comprising:
a processor;
a non-transitory computer readable medium connected to the processor an having stored thereon instructions that, when executed, cause the processor to:
receive a service request message sent by an application server;
determine whether the received service request is a test request;
parse the test request and obtain a test instruction from the test request in response to determining that the service request is a test request, wherein the test instruction comprises an instruction for at least one of constructing a response indicating normal, constructing a response indicating abnormal, constructing a status report, or constructing a mobile originated request message through a mobile terminated request message;
perform a corresponding action according to the test instruction obtained from the test request by parsing the test request, wherein the instructions causing the processor to perform the corresponding action comprise instructions causing the processor to construct, according to the service request message and in response to the test instruction being the instruction for constructing the mobile originated request message through the mobile terminated request message, a request message for the application server, send the request message to the application server, and receive a response returned by the application server; and
return a corresponding response to the application server after the performing the corresponding action.

6. The service delivery platform according to claim 5, wherein the instructions causing the processor to determine whether the received service request is a test request comprises instruction that, when execute by the processor, cause the processor to perform at least one of:
determine whether the service request is a test request according to a service address requested by the service request message; or
determine whether the service request is a test request according to a value of a preset field in the service request message; or
determine whether the service request is a test request according to an extended field in the service request message.

7. The service delivery platform according to claim 5, wherein the non-transitory computer readable medium further has stored thereon instructions that, when executed, cause the processor to perform a format check on the service request message before the determining whether the service request is a test request;
wherein the instructions causing the processor to return the corresponding response comprise instructions causing the processor to:
return a response indicating abnormal to the application server when a check result is that the format check fails; and
send an authentication request message to an operation support system to request the operation support system to authenticate the service request when the check result is that the format check succeeds; and
wherein the instructions causing the processor to receive a service request message comprise instructions causing the processor to receive an authentication response message returned by the operation support system after the sending the authentication request message to the operation support system, wherein the authentication response message comprises an authentication result; and
wherein the instructions causing the processor to return the corresponding response further comprise instructions causing the processor to:
return a response indicating abnormal to the application server when the authentication result is that the authentication fails; and
determine whether the service request is a test request when the authentication result is that the authentication succeeds.

8. The service delivery platform according to claim 5, wherein request message includes message content, a message sender address, and a message receiver address, wherein the message content is message content in the service request message or preset content, wherein the message sender address is a message receiver address of the service request message or a preset sender address, and wherein the message receiver address is a message sender address of the service request message or a preset receiver address.

9. A non-transitory computer readable storage medium having instructions stored thereon that when executed by a computer cause the computer to perform a method comprising:
receiving, through a network via the computer, a service request message sent by an application server;
determining via the computer, that the service request is a test request;
parsing via the computer, the test request and obtaining a test instruction from the test request, wherein the test instruction comprises an instruction for at least one of constructing a response indicating normal, constructing a response indicating abnormal, constructing a status report, or constructing a mobile originated request message through a mobile terminated request message; and
performing via the computer, according to the test instruction, a corresponding action and returning a corresponding response to the application server, wherein the performing the corresponding action comprises constructing, according to the test request and in response to the test instruction being the instruction for constructing the mobile originated request message through the mobile terminated request message, a request message for the application server, send the request message to the application server, and receive a response returned by the application server.

* * * * *